UNITED STATES PATENT OFFICE.

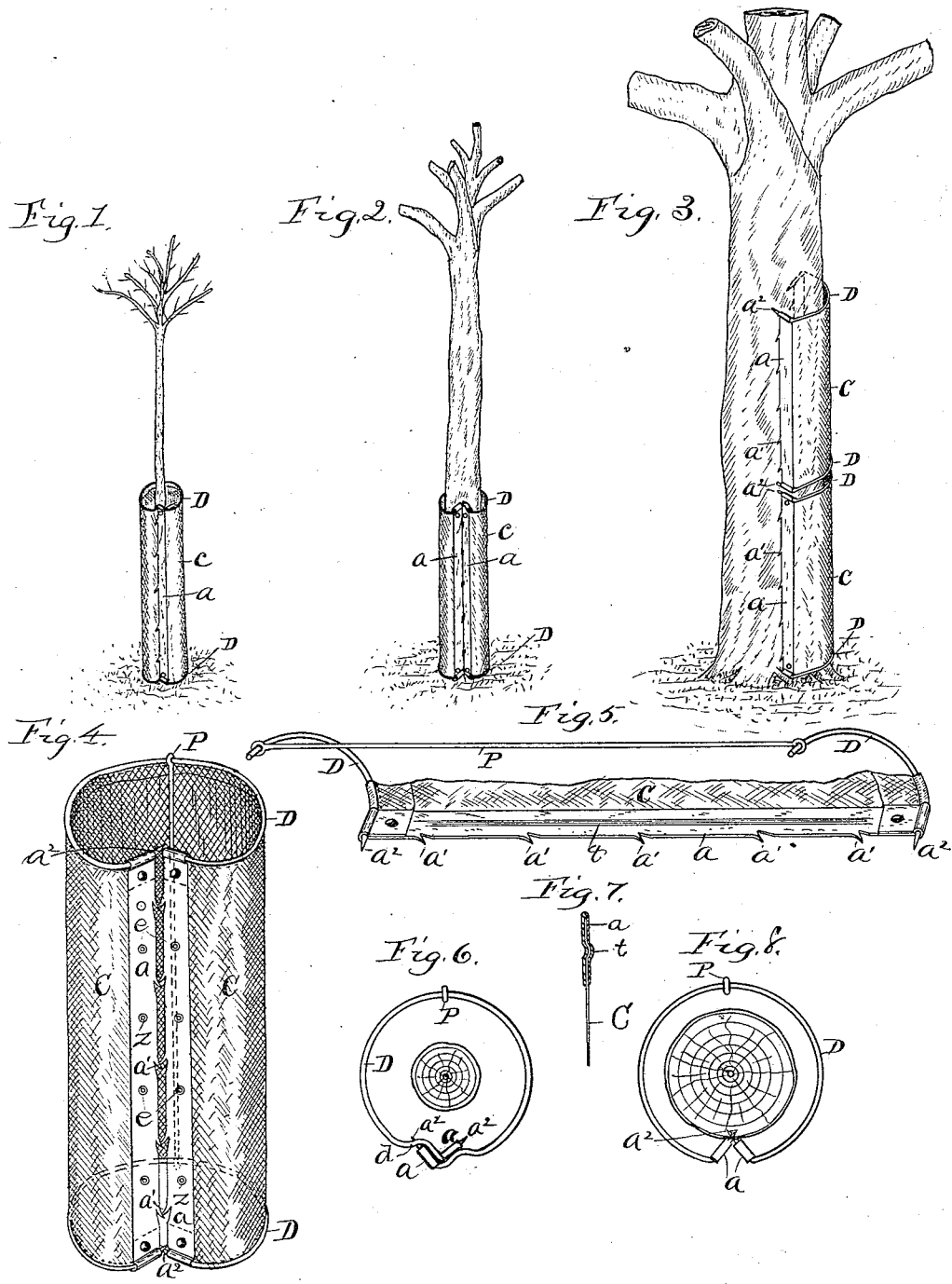

LEON C. FOUQUET, OF ANDALE, KANSAS.

TREE-PROTECTOR.

SPECIFICATION forming part of Letters Patent No. 428,206, dated May 20, 1890.

Application filed October 4, 1889. Serial No. 326,017. (No model.)

*To all whom it may concern:*

Be it known that I, LEON C. FOUQUET, a citizen of the United States of America, residing at Andale, in the county of Sedgwick and State of Kansas, have invented certain new and useful Improvements in Tree-Protectors, reference being had therein to the accompanying drawings and the letters of reference thereon, forming a part of this specification, in which—

Figures 1 and 2 are perspective views of my invention applied as a protector to small trees. Fig. 3 is a perspective view of my invention applied to a large tree as a sun-shield. Fig. 4 is a perspective view of my invention as it would appear ready for use. Fig. 5 is a detail perspective view of a portion of my invention to more clearly show the construction of the frame. Fig. 6 is a top plan view of the protector as it would appear when applied to a young tree. Fig. 7 is a cross-sectional view of one side bar and a portion of the fabric of the protector; and Fig. 8 is a top plan view of the protector as it would appear when applied to a medium-sized tree.

This invention relates to certain improvements in that class of tree-protectors adapted to be used as a protector for young trees against injury by small animals, such as rabbits and the like; also to protect or shield large trees from the action of the sun's heat on the side most exposed; and it consists of two spring-hoops divided at one side and connected at either side of their division by a bar, and opposite the division by another bar, in such manner as to form the end frame-work of the device, and covered with fabric or some flexible material, forming the side walls thereof, and open at either end, the bars adjacent the side division being provided with barbs or prods for gripping the sides of a tree, and the whole adapted to spring open at its side division to admit its application to a tree.

Referring to the drawings, D D represents the spring-hoops divided at one side, which may be of spring-wire or any suitable material. A A represent the bars connecting said hoops—one at either side of the side division—which may be termed the "side" bars, and P represents the opposite bar connecting said hoops opposite bars $a\,a$, which parts form the frame-work of my invention.

C represents the fabric or flexible covering forming the side walls of the protector, and is secured to either hook D and to the bars $a\,a$, as shown in Figs. 4 and 5, wherein said bars are represented as being made of sheet metal folded double, with the material C clamped within the fold, (see also Fig. 7,) and held therein by means of breaking the surface-plane of the metal with a punch, as shown at intervals at $e$ in Fig. 4, or by one elongated indenture, as shown at $t$ in Figs. 5 and 7. However, bars $a\,a$ may be of any suitable material or form which will properly support the hoops and covering.

A' represents prods extending from bars $a\,a$ for the purpose of gripping a tree to hold the protector properly in position when applied to trees of any considerable growth, (see Figs. 3 and 8;) also, the hoops D D may terminate at their division with prods, as shown at $a^2$, for a like purpose.

In applying the protector to young trees the hoops D D may be bent adjacent the bars $a\,a$, as shown in Fig. 6, when the bars $a\,a$ may overlap each other, and thus hold the prods $a'\,a^2$ out of position from engagement with the tree, so as not to injure the tree thereby by means of the action of the wind or other means moving the protector.

In ordinary application, in order that the prods $a'\,a^2$ may properly grip the tree, the hoops D D are bent adjacent bars $a\,a$, so that the said prods of one bar will be at about a right angle to those of the fellow bar, and thus be more fairly presented to the tree, and also hold the protector-walls a distance from the tree.

In Fig. 1 the protector is shown as applied to a young tree as a protector against rabbits and other small animals liable to gnaw the tree, and thereby injure it, and is shown as having its bars $a\,a$ overlapped, as more clearly shown in Fig. 6. In Fig. 2 the application is made to a tree of medium size and for the like purpose, with its bars $a$ meeting and gripping the tree, as more clearly shown in Fig. 8; and in Fig. 3 the protector is shown as expanded or the bars $a\,a$ sprung apart and gripped to a large tree by means of its prods, as described, thus accommodating trees of different diameters, and may be used one above another if one is not of sufficient height. By thus constructing the protector it will when applied to a tree automatically adjust itself to the tree as the tree grows and devolops, by means of its side division and flexibility, without choking or in any wise injuring the tree, as the prods of the protector will merely grip the outer surface of the bark of a tree and not enter to harm the tree-body.

Having thus described my invention, what I claim as new and useful, and desire to secure by Letters Patent, is as follows:

1. The tree-protector described, consisting of the spring-hoops D and D, divided at one side, adapting them to be spread apart at their division to admit of their application to a tree, the bars $a$ and $a$, respectively provided with the prods $a'$, which bars are arranged connecting said hoops, one adjacent either side of said division, thereby forming the protector-frame, and the fabric or flexible material C, secured to said hoops and bars, thereby forming the protector-walls, substantially as and for the purpose set forth.

2. The tree-protector consisting of the divided spring-hoops D D, having the prods $a^2$, the folded bars $a$, provided with the prods $a'$ and connecting together said hoops adjacent their division and arranged with their plane at about a right angle to each other, the bar P, connecting together the center part of said hoops, and the fabric or flexible material C, secured about said hoops and between the folds of said prodded bars, substantially as and for the purpose set forth.

LEON C. FOUQUET.

Witnesses:
J. W. ANDERSON,
G. W. MAYBERRY.